United States Patent [19]

Christe

[11] Patent Number: 4,903,479
[45] Date of Patent: Feb. 27, 1990

[54] RADIATION AUGMENTED ENERGY STORAGE SYSTEM

[75] Inventor: Karl O. Christe, Calabasas, Calif.

[73] Assignee: Rockwell International Corporation, El Segundo, Calif.

[21] Appl. No.: 169,701

[22] Filed: Mar. 18, 1988

[51] Int. Cl.[4] .............................................. F02K 9/42
[52] U.S. Cl. .................................... 60/203.1; 60/214; 60/257; 60/39.461
[58] Field of Search ...................... 60/257, 39.461, 205, 60/211, 214, 203.1, 204

[56] References Cited

U.S. PATENT DOCUMENTS

| | | | |
|---|---|---|---|
| 3,071,924 | 1/1963 | Carr | 60/39.461 |
| 4,182,663 | 1/1980 | Vaseen | 204/157.3 |
| 4,214,439 | 7/1980 | Browning et al. | 60/39.463 |
| 4,548,033 | 10/1985 | Cann | 60/203.1 |

OTHER PUBLICATIONS

Barrere et al. *Rocket Propulsion* Elsevier Publishing Co. New York; 1960, p. 643.
"Radiation Augmented Propulsion Feasibility", S. C. Hurlock et al, Final Report, AFRPL TR-85-068, Dec. 1985.
"Ozone", M. Horvath, et al, Topics in Inorganic and General Chemistry, Monograph 20, Elsevier, Amsterdam, 1985, pp. 196–201.
"Raketentrebestoff", A. Dadieu et al, Springer Verlag, Wien-New York, 1968, pp. 367–368.

Primary Examiner—Louis J. Casaregola
Attorney, Agent, or Firm—H. Fredrick Hamann; Harry B. Field; David C. Faulkner

[57] ABSTRACT

This invention relates to an improved method of storing solar radiation energy in a spacecraft and using it with high efficiency for space propulsion.

2 Claims, 1 Drawing Sheet

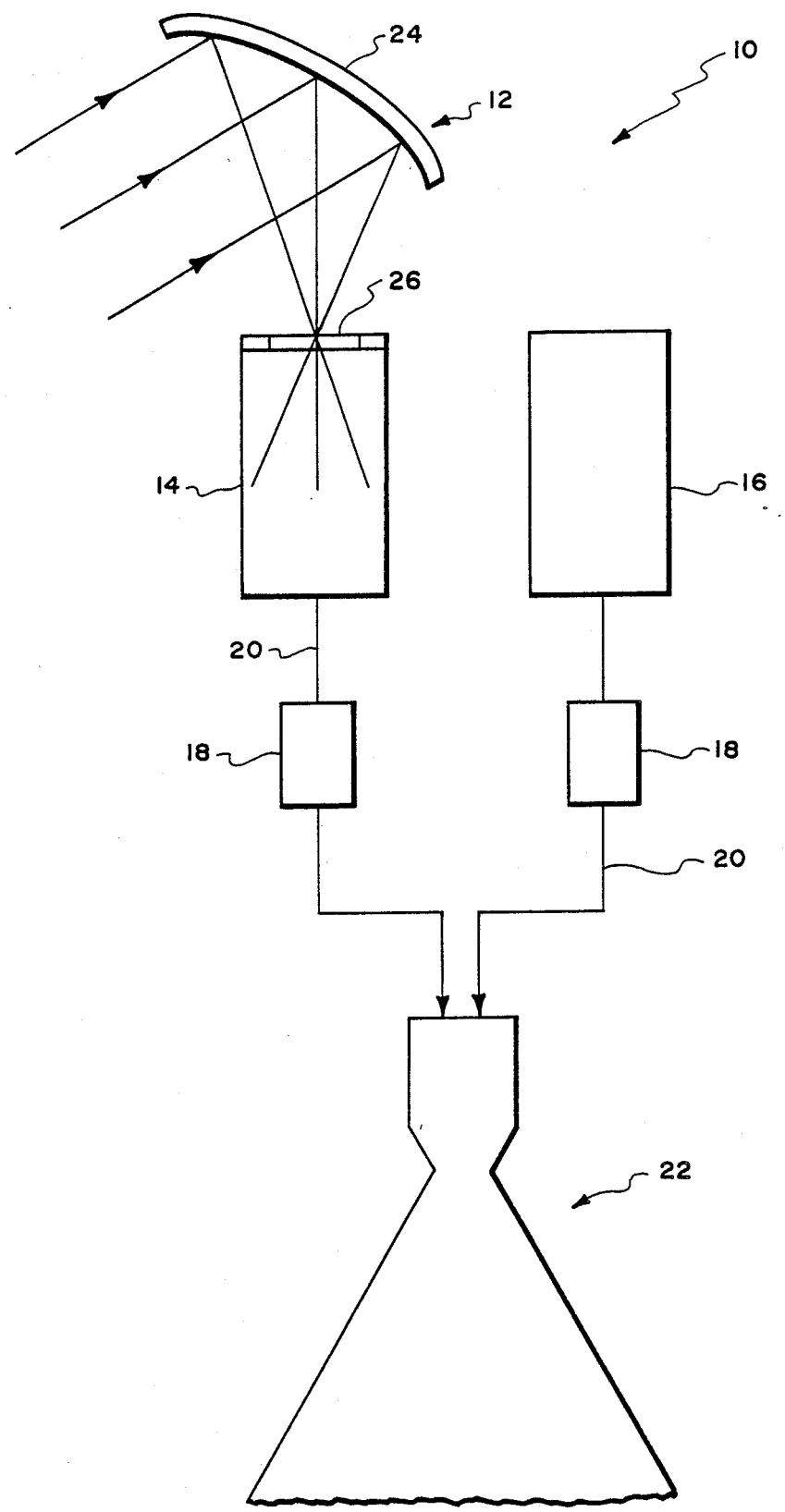

RADIATION AUGMENTED ENERGY STORAGE SYSTEM

BACKGROUND OF THE INVENTION

1. Field of the Invention

The present invention relates to an improved method of storing solar radiation energy in spacecrafts and utilizing it in a highly efficient manner for space propulsion or attitude control thrusters.

2. Prior Art

In outer space, solar radiation is a free source of energy and is widely used for the generation of electricity. Its usefulness for rocket propulsion applications, however, is curtailed because of the following drawbacks: (1) the relatively high cost of solar cells; (2) the relatively low efficiency of these cells, typically in the 10–20% range; (3) the requirement of heavy battery systems for accumulating and storing the electric energy thus generated; and (4) the low efficiency of converting the electric energy into readily available propulsion energy.

A chemical scheme, i.e. the photolysis of chlorine molecules to chlorine atoms has been proposed for the conversion of the solar energy into chemical energy ("Radiation Augmented Propulsion Feasibility", S. C. Hurlock et al, Final Report, AFRPL TR-85-068, Dec. 1985.) However, such a system is impractical in view of the great difficulty of storing chlorine free radicals at a useful pressure without their instant recombination to molecular chlorine and the very low performance of chlorine as an oxidizer in a rocket propulsion system.

OBJECTS OF THE INVENTION

It is therefore an object of this invention to provide an improved radiation augmented energy storage system which efficiently uses solar energy for rocket propulsion purposes.

Another object is to provide easy storage of the energy without the need for battery systems.

Another object is to efficiently recover stored energy for rocket propulsion purposes.

Yet another object is to utilize the same rocket engines and hardware which are being used for the basic propulsion systems, thus eliminating or minimizing the need for any extra, highly specialized hardware.

A further object is to provide a propellant system which is compatible, mixable and interchangeable with the basic liquid oxygen-hydrogen bipropellant system used as the main propellants but provides increased performance.

Other objects, features, and many of the attendant advantages of this invention will become readily appreciated by reference to the following detailed description.

SUMMARY OF THE INVENTION

Accordingly, the present invention provides a method of efficiently storing radiation energy in space and converting it into propulsion energy which comprises the following steps:
(1) photolytically converting oxygen to ozone;
(2) stabilizing the ozone in a solvent;
(3) either extracting a portion of the ozone from the solvent, or, if the solvent is liquid oxygen, using the resulting solution as such, and
(4) combusting either the extracted ozone or the ozone-oxygen mixture with hydrogen in a thruster.

DETAILED DESCRIPTION OF THE INVENTION

In the method of the present invention, oxygen is photolytically converted to ozone. The production of ozone from $O_2$ by photochemical methods is well known, and has been reviewed, for example, in the book "Ozone", M. Horvath, L. Bilitzky, and J. Huttner, Topics in Inorganic and General Chemistry, Monograph 20, Elsevier, Amsterdam, 1985, pages 196–201. Quantum yields of about 2 are readily achieved. In a typical ozone production process, gaseous $O_2$ is photolyzed and the $O_3$ is removed from the resulting $O_2$-$O_3$ mixture by freezing it out at liquid oxygen temperature (see "Raketentreibstoffe", A. Dadieu, R. Damm, and E. W. Schmidt. Springer Verlag, Wien-N.Y., 1968, pages 367–368).

Since pure liquid ozone is difficult to handle in a safe manner and can detonate, it is advantageous to store the ozone in a suitable solvent. The resulting ozone solutions can then be handled safely. Suitable solvents are either liquid oxygen or fluorocarbons, such as $CF_4$, $CF_3Cl$, $CHClF_2$, $CF_2Cl$—$CFCl_2$, etc. Of these solvents, liquid oxygen is of particular advantage because the preferred propellant combination used for space propulsion is liquid oxygen and hydrogen. Since ozone has a higher energy content than oxygen, the performance of the $O_2/H_2$ propellant system can be increased significantly by the use of $O_2$ which contains ozone. The performance calculations given in the following Table clearly demonstrate the benefits obtainable by substituting oxygen by ozone. As can be seen, the specific impulse of the $O_3/H_2$ system exceeds that of the $O_2/H_2$ system by 54 seconds and even that of the $F_2/H_2$ system by 21 seconds.

TABLE

Optimized Specific Impulse for Different Oxidizer - Hydrogen Propellant Combinations

| System | R* | Ivac 1000 → ε = 40 | Tc** °K. |
|---|---|---|---|
| $Cl/H_2$ | 9.695 | 332.3 | 2952 |
| $F_2/H_2$ | 8.709 | 491.0 | 4203 |
| $O_2/H_2$ | 3.968 | 457.7 | 3137 |
| $O_3/H_2$ | 3.921 | 512.1 | 3366 |

*Mole ratio of oxidizer to fuel.
**Flame temperature

The use of liquid oxygen as a solvent for the ozone offers the additional advantage that the ozone does not have to be recovered and separated from the solvent, but can be used directly as a solution.

Whereas the use of liquid $O_2$ enriched with ozone offers distinct advantages for the main propulsion engines, the small attitude control thrusters use only relatively small amounts of propellants at a given time. Therefore, these attitude control thrusters can advantageously be operated with pure ozone as the oxidizer. For this application, the photolytically produced ozone is dissolved in a relatively nonvolatile fluorocarbon in a storage cylinder. When needed, it is withdrawn as a gas from the cylinder and combusted with hydrogen in a thruster, such as disclosed in U.S. Pat. No. 4,548,033, incorporated herein by reference. Since the fluorocarbon storage medium used is nonvolatile, it is not consumed and is required in only small amounts. Furthermore, these attitude control thrusters are being fired only intermittently. Therefore, the bulk of the oxidizer can be stored as liquid $O_2$, with only as much $O_2$ being photolytically converted to $O_3$ as needed at a given time.

As shown in the FIGURE, a conversion/storage and utilization assembly 10 consists of a solar energy focusing unit 12, propellant storage tanks 14 and 16, pumps 18, conduits 20, and a thrust chamber 22 for converting propellants into energy.

The solar energy focusing unit 12 is aligned and integrally connected by a truss support (not shown) so that sunlight, as indicated by the arrows, is reflected and focused by a reflective parabolic mirror 24, through a light transmitting aperture 26 integrally associated with propellant storage tank 14. As sunlight enters tank 14, a photolytic reaction occurs with liquid oxygen contained therein converting a portion of the oxygen into ozone.

When impulse power is to be produced by the utilization assembly 10, pumps 18 are activated, by controlled means known in the art, causing the flow of an ozone and oxygen mixture from tank 14 and a fuel such as liquid hydrogen from tank 16. These fluids are transported by conduits 20 into the assembly thrust chamber 22 where they are converted into energy.

As can be seen from the above description, the present invention offers numerous advantages over the state of the art. Among these advantages are:

(1) the radiation energy is directly deposited in the oxidizer used for the main propulsion system, thus eliminating inefficient energy conversion processes and the need for heavy energy storage systems, such as batteries;

(2) the amount of additional hardware required is minimized because the same propellants and thrusters are shared with the basic $O_2/H_2$ propulsion system; and (3) the $O_3/H_2$ system offers a very substantial increase in performance, even higher than that of the $F_2/H_2$ system.

The foregoing detailed description is provided by way of illustration and intended only to be limited by the scope of the following appended claims.

What is claimed and desired to be secured by Letters Patent of the United States is:

1. A method of converting radiation energy into chemical energy to produce a high-performance propellant, said method comprising:
    (a) Photolytically converting oxygen to ozone;
    (b) storing and stabilizing the ozone in liquid oxygen to form an ozone/liquid oxygen solution; and
    (c) combusting the ozone/liquid oxygen solution with hydrogen.

2. The method of claim 1 wherein the solution of ozone in liquid oxygen is an oxidizer.

* * * * *